US010150494B2

(12) United States Patent
Young, Jr.

(10) Patent No.: US 10,150,494 B2
(45) Date of Patent: Dec. 11, 2018

(54) SYSTEM AND METHOD FOR TRANSPORTING AN OBJECT TO BE MOVED

(71) Applicant: THE BOEING COMPANY, Chicago, IL (US)

(72) Inventor: James W. Young, Jr., Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 71 days.

(21) Appl. No.: 15/087,608

(22) Filed: Mar. 31, 2016

(65) Prior Publication Data

US 2017/0282778 A1  Oct. 5, 2017

(51) Int. Cl.
*B62B 3/04* (2006.01)
*B62B 3/10* (2006.01)
*B62B 5/00* (2006.01)
*B62B 3/00* (2006.01)

(52) U.S. Cl.
CPC ............ *B62B 5/0083* (2013.01); *B62B 3/009* (2013.01); *B62B 3/04* (2013.01); *B62B 3/102* (2013.01); *B62B 3/108* (2013.01); *B62B 5/0086* (2013.01); *B62B 2202/30* (2013.01)

(58) Field of Classification Search
CPC .............. B62B 5/0086; B62B 2202/30; B62B 2203/44; B62B 1/04; B62B 1/102; B62B 3/04; B62B 3/102; B62B 3/009; B62B 3/108; B62B 5/0093
USPC ................................ 280/79.11, 79.7; 414/11
See application file for complete search history.

(56) References Cited

U.S. PATENT DOCUMENTS

| 1,738,096 | A | * | 12/1929 | Cole | ...................... B62B 3/104 |
| | | | | | 414/448 |
| 2,733,929 | A | * | 2/1956 | Edixon | ................. B62B 5/0083 |
| | | | | | 280/35 |
| 3,327,996 | A | * | 6/1967 | Morse | ................... B62B 5/0086 |
| | | | | | 414/458 |
| 3,338,591 | A | * | 8/1967 | Rowland | ................... B62B 3/10 |
| | | | | | 280/79.11 |
| 3,684,110 | A | * | 8/1972 | Meyercord | ............... B62B 3/04 |
| | | | | | 414/444 |

(Continued)

FOREIGN PATENT DOCUMENTS

| DE | 10203426 | A1 | * | 8/2003 | ............... B62B 3/04 |
| GB | 2424668 | | | 10/2006 | |
| GB | 2491898 | A | * | 12/2012 | ........... B62B 5/0093 |

OTHER PUBLICATIONS

Combined Search and Examination Report of the United Kingdom Patent Office for Application No. GB1704665.7, dated Sep. 6, 2017.

(Continued)

*Primary Examiner* — James Keenan
(74) *Attorney, Agent, or Firm* — Toler Law Group, P.C.

(57) ABSTRACT

A device and method is provided that includes a plurality of dollies. Each dolly includes a base portion and a plurality of wheels attached to the base portion. Each dolly further includes side walls extending from the base, and defining a channel, an adjustment mechanism and an engagement member disposed along an inside of one of the sidewalls and configured to deform when a pressure is applied to secure an object within the channel. A block portion is provided within the channel.

17 Claims, 4 Drawing Sheets

(56) References Cited

U.S. PATENT DOCUMENTS

| | | | | |
|---|---|---|---|---|
| 3,942,813 | A * | 3/1976 | Dombroski | B62B 1/14 280/47.131 |
| 4,178,006 | A * | 12/1979 | Johnson | B62B 5/0083 280/79.11 |
| 4,210,341 | A * | 7/1980 | Minkoff | B62B 3/04 280/79.11 |
| 4,852,895 | A | 8/1989 | Moffitt | |
| 5,486,014 | A * | 1/1996 | Hough | B62B 5/0083 280/79.11 |
| 5,788,251 | A | 8/1998 | Johnson | |
| 5,879,014 | A * | 3/1999 | Price | B62B 3/02 280/47.18 |
| 5,924,168 | A * | 7/1999 | Webb | B62B 5/0086 16/30 |
| 5,927,731 | A * | 7/1999 | Clarke | B62B 3/108 280/47.24 |
| 6,231,034 | B1 | 5/2001 | Walker et al. | |
| 6,250,655 | B1 * | 6/2001 | Sheeks | B62B 1/268 280/47.18 |
| 6,575,481 | B1 * | 6/2003 | Davis | B62B 5/0083 280/47.17 |
| 7,311,487 | B1 * | 12/2007 | Crossley | B65G 7/02 414/458 |
| 7,891,675 | B2 * | 2/2011 | Dobra | B62B 5/0093 280/6.155 |
| 8,002,293 | B2 * | 8/2011 | Lear | B62B 3/008 280/47.34 |
| 8,348,287 | B1 * | 1/2013 | Smith | B62B 3/04 280/47.34 |
| 8,540,254 | B2 * | 9/2013 | Jensen | B62B 3/02 280/47.28 |
| 8,641,061 | B1 * | 2/2014 | Sims | B62B 3/022 280/651 |
| 9,061,697 | B2 * | 6/2015 | Veronie | B62B 3/10 |
| D776,392 | S * | 1/2017 | Prichard | D34/28 |
| 2002/0113390 | A1 | 8/2002 | Hallman et al. | |
| 2006/0232034 | A1 | 10/2006 | Skiles | |
| 2014/0097585 | A1 | 4/2014 | Baird | |

OTHER PUBLICATIONS

Patent Examination Report for Application No. GB1704665.7, dated May 18, 2018, 3 pgs.

* cited by examiner

SYSTEM AND METHOD FOR TRANSPORTING AN OBJECT TO BE MOVED

BACKGROUND

The present disclosure relates in general to a system and method that allows for the transportation of an object to be moved, such as office furniture.

Proper practices in the transportation of office furniture, workstation subcomponents, and other large or heavy devices in an office environment are a consideration for companies and individuals. In the movement of large office furniture, conventional methods employ placing the furniture on a large, four-wheeled device. Moving the furniture with such a device generally involves at least two people.

Additionally, because of the configuration of conventional furniture moving devices, when using such conventional devices for moving a piece of office furniture, the total width and/or length of the unit to be moved increases, often substantially, adding to particular difficulty moving the office furniture through doors, around walls and corners, and the like. Further, the use of conventional devices may have an inherent lack of stability, and the office furniture being moved is may be prone to slipping or tipping over during transportation.

In some office environments, tables can weigh approximately 125 pounds, have a 6 foot by 4 foot area, and have irregularities throughout the shape of the table, making the transportation of such a table particularly challenging.

SUMMARY

In one embodiment, a system is provided that includes a plurality of dollies each attachable to an object to be moved. Each dolly includes a base portion including a first end and a second end and a plurality of wheels attached to a bottom portion of the base portion. Each dolly further includes side walls extending perpendicularly upward from the base portion and defining a channel, an adjustment mechanism, and an engagement member disposed along an inside of one of the side walls, the engagement member configured to deform when a pressure is applied thereto by the adjustment mechanism to thereby secure the object to be moved within the channel. An inside of the channel includes a block member disposed at the first end of the base portion and to angle the object secured within the channel.

In another embodiment, a method for transporting an object to be moved is provided. The method includes placing a first dolly and a second dolly on respective extension portions of an object to be moved. Each dolly includes a base portion including a first end and a second end and wheels attached to a bottom portion of the base portion. Each dolly further includes side walls extending perpendicularly upward from the base portion and defining a channel, an adjustment mechanism, and an engagement member disposed along an inside of one of the side walls. An inside of the channel includes a block member disposed at the first end of the base portion and to angle the object secured within the channel and to allow the object to be moved to be supported in a cantilevered manner. Each dolly is placed on the respective extension portion of the object to be moved while the object is oriented in a rest position, the wheels of each dolly being oriented facing outward, the dollies each oriented on a side. The method further includes attaching the object to be moved by operating the adjustment mechanism for each dolly so that the adjustment mechanism abuts the engagement member so as to deform the engagement member and thereby secure the object to be moved within the channel. The block member of each dolly contacts the respective extension portion of the object to be moved. The object to be moved is rotated to a position whereby the object to be moved is placed on a side, with the dollies each sitting upright and having respective wheels contacting the floor surface.

In another embodiment, a dolly is provided. The dolly includes an adjustable pressure plate having two positions, one position configured to secure the dolly to a leg of the table, and the other position configured to free the table from the dolly. The dolly is configured to support the table essentially on a side, but cantilevered so as to reduce a tipping likelihood of the table during transport.

DETAILED DESCRIPTION

The following detailed description of certain embodiments will be better understood when read in conjunction with the appended drawings. It should be understood that the various embodiments are not limited to the arrangements and instrumentality shown in the drawings.

Various embodiments provide apparatuses and methods for moving an object to be moved, such as furniture. More specifically, the systems and methods described herein include at least a pair of dollies that can be used to support furniture in a vertical orientation that cantilevers the furniture. The cantilevering may reduce the likelihood that the furniture will slip or tip during transport. Further, the vertical orientation facilitates moving irregular-shaped furniture through hallways, doorways, turns, and/or past obstacles (e.g., other furniture).

Although the system and method are described here as being used to move furniture, it should be appreciated that various embodiments may be used may be used in different applications to move different types of objects. Thus, while embodiments may be described in connection with moving a piece of office furniture, other applications and operating environments are contemplated.

Figure 1:
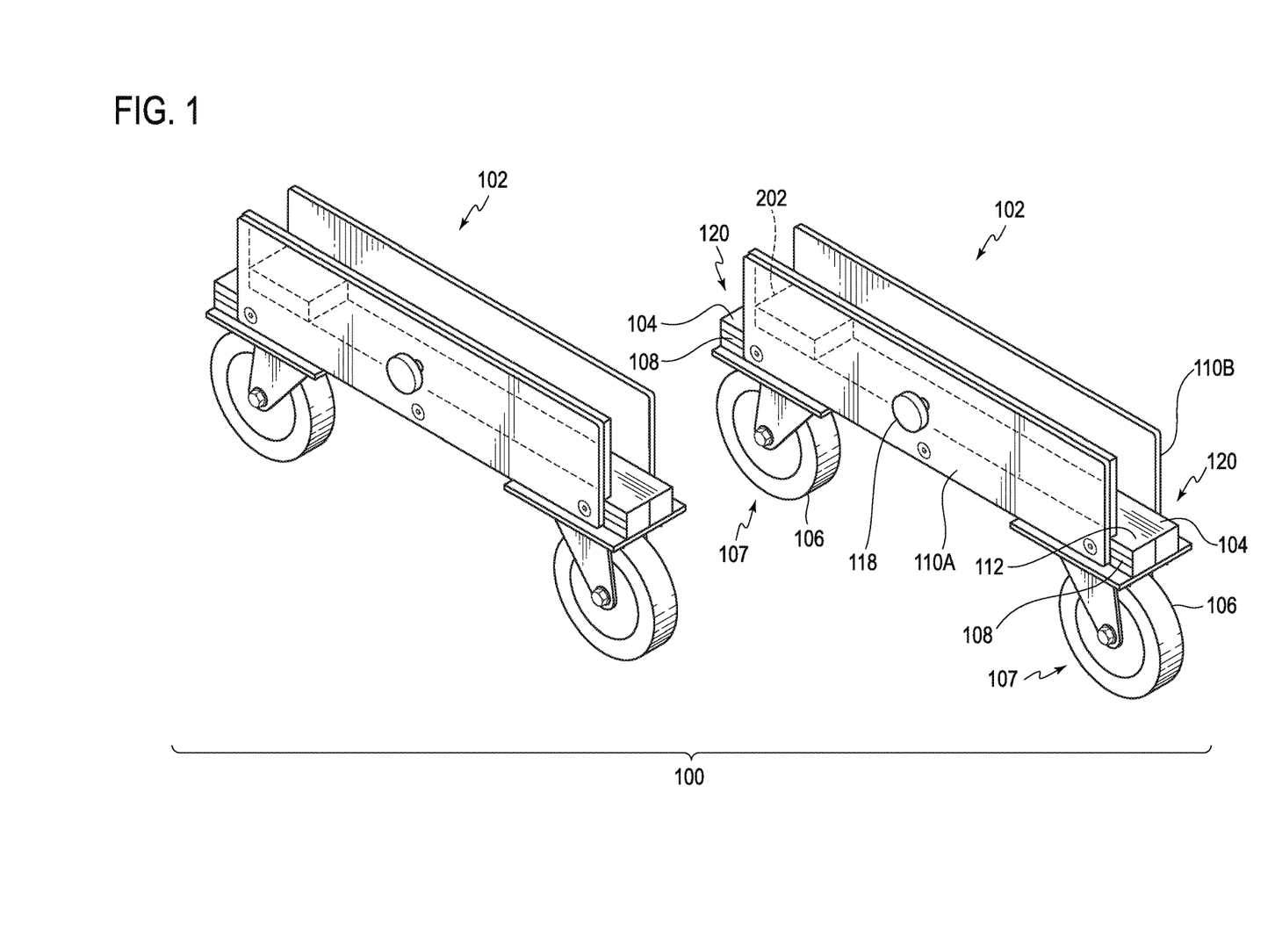
FIG. 1 is a diagram illustrating a moving system in accordance with an embodiment.

As can be seen in FIG. 1, in the illustrated embodiment, a moving system 100 in accordance with various embodiments includes a plurality of moving members, shown as a pair of wheeled dollies 102. It should be appreciated that additional dollies 102 may be provided depending on the particular use and application, such as the size of the object to be moved. A discussion of one of the dollies 102 follows, but in the illustrated embodiment, both dollies 102 have the same configuration.

The dolly 102 includes a base portion 104, which in the illustrated embodiment is a planar support base having coupled thereto a pair of wheels 106 allowing for movement of the dolly 102. The base portion 104 may be made of any suitable material, such as aluminum, other metal, plastic, composite, or, in some embodiments, BOSCH® tubing ("BOSCH" is a registered trademark of Robert Bosch GMBH of Gerlingen, Germany). The base portion 104 may be a single, integral portion or may be a formed of metal or other suitable material connected together via screws, welds, or any other suitable attachment mechanism. Additionally, the wheels 106 are generally coupled to a lower side of the base portion 104 at end regions thereof. It should be appreciated that the number and location of the wheels 106 may be varied as desired or needed. Moreover, the wheels 106 may be selected based on the particular application, for example, based on the weight of an object to be supported by and moved with the dolly 102.

Extending longitudinally along each edge or side 108 of the base portion 104 are side walls 110A and 110B. The side walls 110A and 110B may be coupled to the base portion 104 by screws or any other suitable attachment mechanism or method. In some embodiments, the side walls 110A and 110B may be integrally formed with the base portion 104. The side walls 110A and 110B extend upward (vertically when in use) from a top portion 112 of the base portion 104. The side walls 110A and 110B may extend downward below the top portion 112 of the base portion 104, or may, as shown in FIG. 1, have their lowest portion at or near a bottom of the base portion 104. The side walls 110A and 110B are sized to extend a distance that allows for forming a channel 114 (as shown in FIG. 2) therebetween for receiving and supporting therein a portion of an object to be moved (e.g., a portion of a leg of a table).

Figure 2:
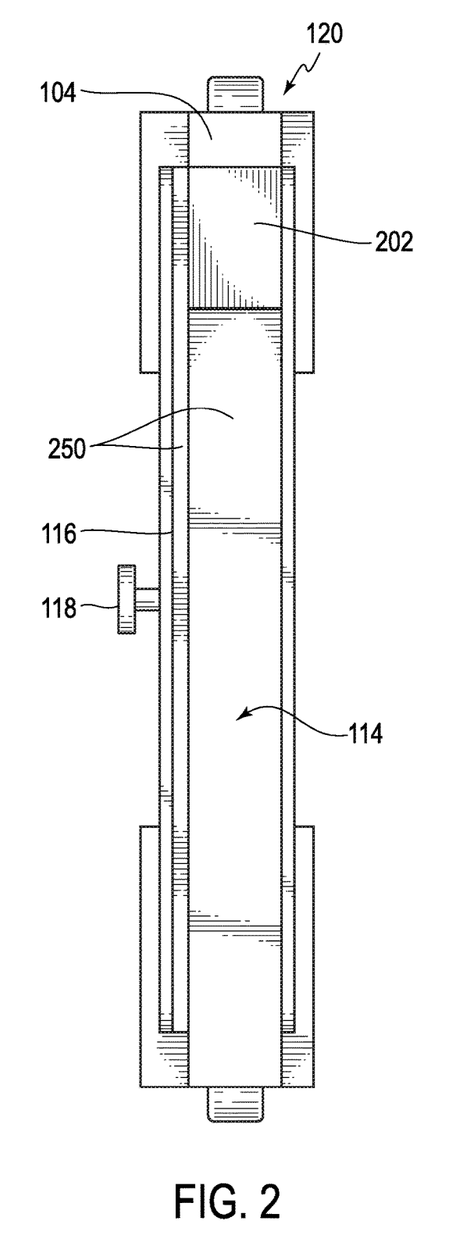
FIG. 2 is a diagram showing a top view of a moving member in accordance with an embodiment.

At least one of the side walls 110A and 110B includes an engagement member 116 (illustrated as a side plate or a pressure plate and shown in FIG. 2) that is adjusted using an adjustment mechanism 118. The adjustment mechanism 118 may be a screw, knob, or any device capable of rotation or compression and that causes a movement of the engagement member 116 (e.g., inward deformation of the engagement member 116 into the channel 114). For example, in embodiments where the adjustment mechanism 118 includes a knob, the arrangement further includes an extension portion (not shown) that, upon manual rotation of the knob such as a clockwise rotation, will press against engagement member 116 (shown in FIG. 2) to thereby define a pressure plate located on an inside of the side plate 110A within the channel 114. In operation, the engagement member 116 can have pressure applied thereto increased or decreased by a rotation and counter-rotation, respectively, of the knob, such as by twisting the knob in a clockwise or counterclockwise manner.

The adjustment mechanism 118, such as a knob and extension portion, may be positioned at a geometric center of the side plate 110A, but the location is not particularly limited. Further, the knob and extension portion may be placed within a hole that is drilled or otherwise provided in a predetermined location of the side plate 110A.

Thus, the engagement member 116 is disposed at an inside of the side plate 110A and adjustable pressure may be applied to the engagement member 116 by the adjustment mechanism 118.

As shown in FIG. 2, in some embodiments, the engagement member 116 is a pressure plate that extends longitudinally alongside and abuts the side wall 110A. It should be noted that although the engagement member 116 is illustrated as extending along the entire length of the side wall 110A, the length, height and width (thickness) of the engagement member 116 may be selected as described or needed, such as to be longer, shorter, wider, less wide, higher, or less high than the side wall 110A. Thus, the engagement member 116 does not extend along the full length of the side wall 110A in some embodiments. The engagement member 116 may be made of any suitable material, such as a plastic material or other material that is capable of some deformation when a pressure is applied thereto. In some embodiments, the engagement member 116 is made of neoprene.

Figure 3:
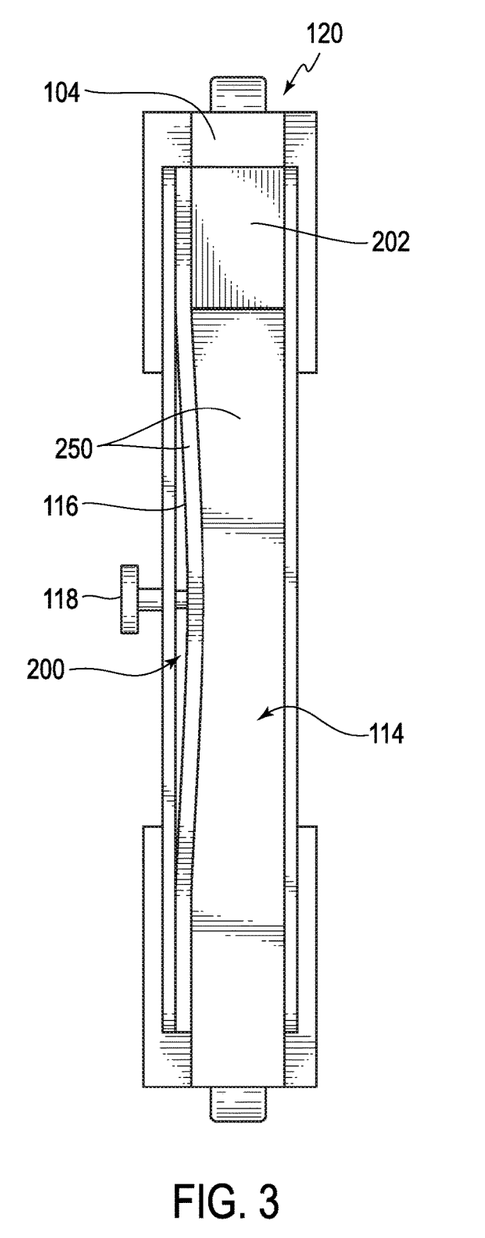
FIG. 3 is a diagram illustrating a top view of a moving member being operated in accordance with an embodiment.

In operation, as shown in FIG. 3, upon the rotation of the adjustment mechanism 118 (illustrated as a knob), the engagement member 116 is biased or moved toward a center of the channel 114 defined between the side walls 110A and 110B. Thus, in operation, when a pressure is applied to the engagement member 116, at least a portion of the engagement member 116 is deformed into the channel 114. The channel 114 in some embodiments may be about 2 inches to about 4 inches, or about 3 inches in width. When the adjustment mechanism 118 is operated (e.g., rotated), which may be 1-3 rotations or more, a gap 200 is formed between the side wall 110A and the engagement member 116. It should be appreciated that the gap 200 is formed in the illustrated embodiment along a portion of the engagement member 116 at which pressure is applied and causes a bowed out deformation in that portion of the engagement member 116. The gap 200 in some embodiments may range in size from 0.1-1 inches depending upon the amount or pressure applied to the engagement member 116.

Referring back to FIG. 1, the wheels 106 may be any suitable wheel and may form a part of a caster 107. The wheels in some embodiments may be lockable. The wheels may be locked so as to allow for the dolly 102 to be positioned without the dolly 102 undesirably moving during attachment or when attached to the object to be moved, but can be unlocked to allow for maneuverability during positioning and transport of the object to be moved.

The number of wheels 106 included on the dolly 102 is not particularly limited, but in some embodiments, such as that shown in FIG. 1, each dolly 102 includes two wheels 106. The wheels 106 are positioned near each longitudinal end 120 of the base portion 104, and are coupled to the base portion 104 by screws, clamps, welds or the like. In some embodiments, the base portion 104 extends a longitudinal distance beyond the wheels 106, such as shown in FIG. 1. In such a configuration, the wheels 106 may be placed in any suitable location, but in some embodiments, the wheels are placed 1-3 inches from the longitudinal ends 120 (defining a first end and a second end) of the base portion 104.

As shown in FIGS. 2 and 3, at one longitudinal end 120 of the base portion 104, which may be the rear end (or first end in some embodiments), a block member 202 is disposed. The block member 202 may be a support element made of any suitable material, such as plastic, and, in some embodiments, a neoprene plastic, and supports an object to be moved in a cantilevered manner as described in more detail herein. The block member 202 in some embodiments extends the entire extent of the width of the channel 114 (e.g., extends a full width-wise distance of the channel 114). A height (H) of the block member 202 is less than a height of the side walls 110A and 110B in various embodiments to allow the cantilevered object to be vertically offset while still engaged and supported within the channel 114. However, in some embodiments, the block member 202 may extend to the full height of the side walls 110A and 110B, or even higher than a height of the side walls 110A and 110B.

The block member 202 is configured to allow the object to be moved to be disposed at a particular orientation within the channel 114 to thereby allow the object to be moved and to be secured in, for example, a cantilevered manner, while being angled at an amount to increase stability. In some embodiments, the angle of inclination of the object to be moved, from a front end of the base portion to a rear end of the base portion having the block member 202, is about one inch (resulting in a tilt or cantilevering of about twenty degrees). However, depending on the particular application and use, or based on the size and/or weight of the object to be moved, the angle of inclination may be varied, such as by adjusting the height and/or length of the block member 202. In various embodiments, the block member 202 results in an object to be moved to be positioned at an angle of less than ninety degrees with respect to the ground when moved so as to increase the stability of the overall assembly.

It should be appreciated that although the block member 202 is illustrated as having a rectangular shape, different shapes and configurations are contemplated. For example, in some embodiments, a top side of the block member 202 is angled downward from an outer end to an inner end of the block member 202. Additionally, the block member 202 may be a separate piece coupled within the channel 114 or integrally formed therein.

As shown in FIGS. 2 and 3, each dolly 102 may optionally include cushioning material 250 at an inside of the side walls 110A and 110B and/or atop the base portion 104, so as to allow for additional support and protection for the object to be moved. The insulation 250 may be made of any suitable material, such as a plastic or foam material. The insulation 250 may be provided as a part of the structure of the dolly assembly, or may be added as an addition to the dolly assembly prior to attachment to the object to be moved.

Figure 4:
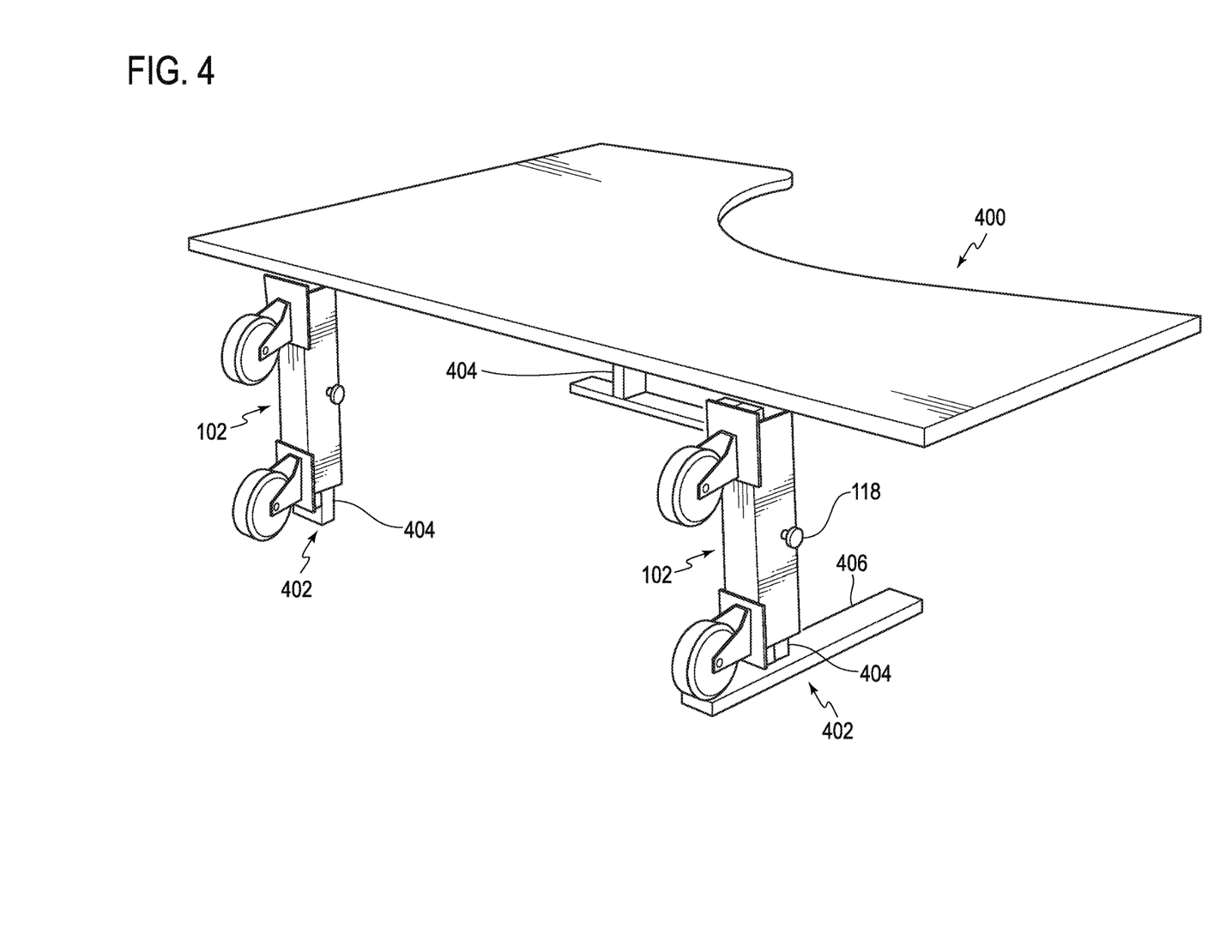
FIG. 4 is a diagram of a plurality of moving members attached to an object to be moved in accordance with an embodiment.

FIG. 4 shows a plurality of dollies 102 being secured to an object to be moved, which is illustrated as a table 400 (e.g., an office desk). In the illustrated embodiment, two dollies 102 are shown as being attached to legs 402 of the table 400. The dollies 102 may be secured to the legs 402 as shown in FIG. 4. In the embodiment shown, the table 400 includes two legs 402 having extension portions 404 extending downward from the base of the table in a resting position of the table 400. The table 400 also includes a resting portion 406 perpendicular to the extension portion 404 and disposed to lie on a floor surface when the table 400 is in the resting position.

The dollies 102 are secured to the extension portions 404 by placing the dolly 102 in a position whereby a substantial portion of the extension portion 404 is received within and abuts or rests in the channel 114 of each of the dollies 102. The adjustment mechanism 118 (e.g., a knob) is then rotated so as to apply a pressure to the engagement member 116 such that the extension portion 404 of the table 400 is secure within by sandwiching the extension portion 404 in the channel 114 by the side wall 110B and the engagement member 116 acting as a pressure plate. It should be noted that in the embodiment shown in FIG. 4, during the attachment of the dollies 102 to the extension portion 404, the table 400 may be in the resting position and the dollies 102 may be disposed on their side so that the wheels 106 extend away from the table 400.

By securing the extension portion 404 of the table 400 to the dollies 102 in the manner shown in FIG. 4, the table 400 can be supported in a cantilevered fashion, with a part of the extension portion 404 resting against the block member 202 that is disposed at a rear end (one longitudinal end 120) of the base portion 104 being at an angle with respect to the portion of the extension portion 404 disposed closer to a front end (another longitudinal end 120) of the base portion 104.

Figure 5:
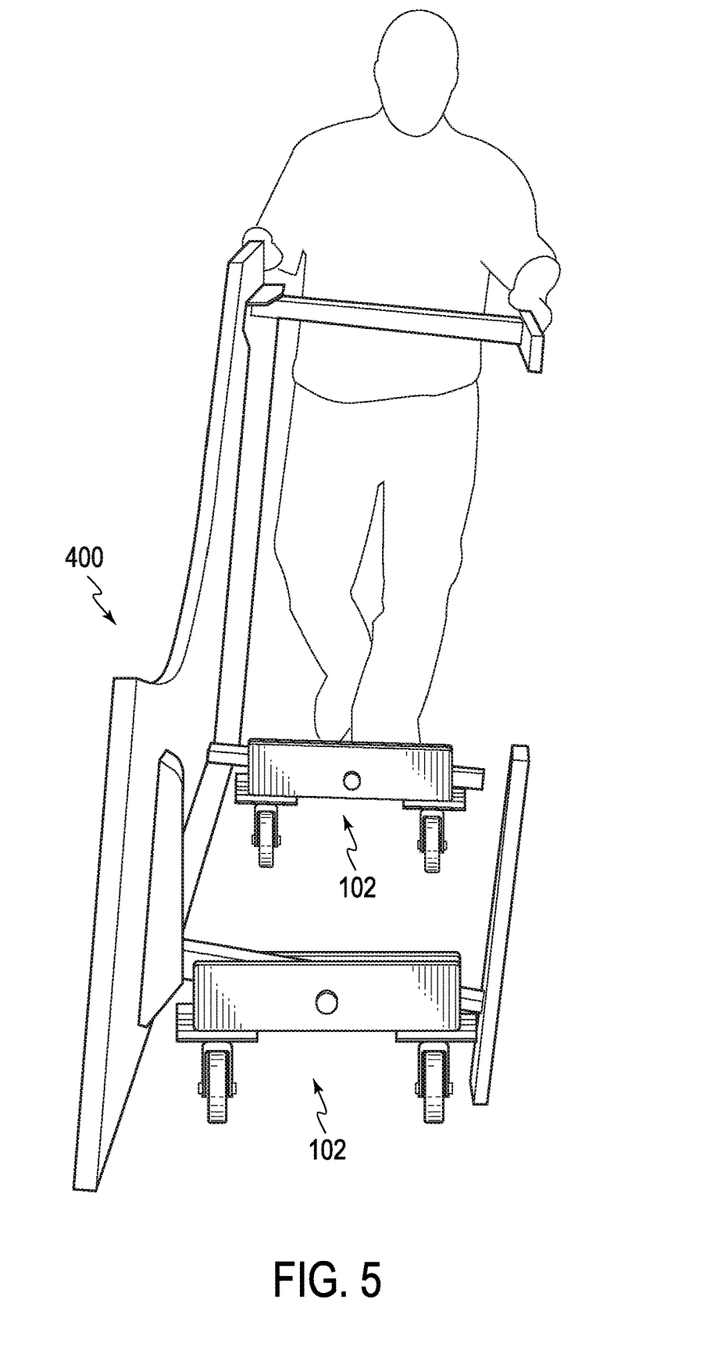
FIG. 5 is a diagram of an object to be moved during transport using the system in accordance with an embodiment.

As shown in FIG. 5, the assembled dollies 102 and table 400 can be rotated so that the table 404 is placed on a side or essentially on a side with the dollies 102 lying flat, and the wheels 106 being placed on the floor surface to allow for the movement of the table 404. In various embodiments, the installation of the dollies 102 to the table 400, the movement then of the table 400 from an installation position to a movement position, and the movement of the table 400 may be accomplished by a one person. Moreover, because the table 400 is supported at an angle of less than ninety degrees with respect to the ground, increased stability is provided.

Thus, various embodiments provide a system that allows for a pair of two-wheeled dollies 102 to move an object, such as the table 400, with greater ease of mobility and increased stability.

While the above description is described with respect to a table, it is to be understood that the dollies described herein are suitable to move any type of office furniture, any furniture generally, or any apparatus. The configuration of the dollies 102, such as the height and weight of the dollies 102 can be modified to account for the weight and/or height of the object to be moved.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled.

As used herein, the terms "system," "subsystem," "unit," or "module" may include any combination of hardware that operates to perform one or more functions. Thus, for example, one or more of the components may be implemented in a single piece of hardware or multiple pieces of hardware. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, paragraph (f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method comprising:
   placing a first dolly on a first leg of a table and placing a second dolly on a second leg of the table, each dolly comprising:
      a base portion including a first end and a second end;
      a plurality of wheels attached to the base portion;
      side walls extending from the base portion and defining a channel, wherein the plurality of wheels are connected to the base portion via a portion of the base portion that defines the channel;
      an adjustment mechanism; and
      an engagement member disposed along an inside of one of the side walls, wherein an inside of the channel includes a block member disposed at the first end of the base portion;
   attaching the first dolly and the second dolly to the table by operating the adjustment mechanism for each of the first dolly and the second dolly so that the adjustment mechanism abuts the engagement member so as to deform the engagement member and thereby secure the table within the channel; and
   rotating the table to a position, wherein rotating the table results in the first dolly and the second dolly sitting upright with a first particular plurality of wheels for the first dolly and a second particular plurality of wheels for the second dolly contacting a floor surface, and wherein the block member is configured to angle a corresponding leg of the table such that a tabletop of the table is non-parallel with the ground and is non-perpendicular with the ground after rotating the table.

2. The method according to claim 1, wherein rotating the table moves the first leg from being perpendicular with the ground to being non-parallel and non-perpendicular with the ground.

3. The method according to claim 1, wherein rotating the table moves the base portion from being non-parallel with the ground to being parallel with the ground.

4. The method according to claim 1, wherein the table includes a leg end, wherein the tabletop is closer to the first end of the first dolly than the second end of the first dolly after the first dolly is placed on the table, wherein the leg end is closer to the second end of the first dolly than the first end of the first dolly after the first dolly is placed on the table, wherein the tabletop would be in contact with the ground after rotating the table were the block member missing and the first leg was parallel with the ground, and wherein the leg end would not be in contact with the ground after rotating the table were the block member missing and the first leg was parallel with the ground.

5. The method according to claim 1, wherein attaching the first dolly comprises tightening a turnable knob of the first dolly.

6. The method according to claim 5, wherein attaching the second dolly comprises tightening a turnable knob of the second dolly.

7. The method according to claim 1, wherein the first dolly is attached to the first leg at an angle with respect to the base portion, the angle based on a dimension of the block member, and wherein the first leg is angled at the angle with respect to the ground after rotating the table to the position.

8. A method comprising:
   placing a first dolly on a first leg of a table and placing a second dolly on a second leg of the table, each dolly comprising:
      a base portion including a first end and a second end;
      a plurality of wheels attached to the base portion;
      side walls extending from the base portion and defining a channel, wherein the plurality of wheels are connected to the base portion via a portion of the base portion that defines the channel; and
      a securing mechanism disposed along one of the side walls, wherein an inside of the channel includes a block member disposed at the first end of the base portion;
   attaching the first dolly and the second dolly to the table by operating the securing mechanism for each of the first dolly and the second dolly; and
   rotating the table to a position, wherein rotating the table results in the first dolly and the second dolly sitting upright with a first particular plurality of wheels for the first dolly and a second particular plurality of wheels for the second dolly contacting a floor surface, and wherein the block member is configured to angle a corresponding leg of the table such that a tabletop of the table is non-parallel with the ground and is non-perpendicular with the ground after rotating the table.

9. The method according to claim 8, wherein the base portion is non-perpendicular with the ground prior to rotating the table and after rotating the table.

10. The method according to claim 8, further comprising moving the table in a cantilevered configuration.

11. The method according to claim 8, further comprising adding insulation to the first dolly prior to attaching the first dolly to the table.

12. The method according to claim 8, further comprising locking a caster for each of the plurality of wheels during the rotating of the table.

13. The method according to claim 8, further comprising after rotating the table, transporting the table from a first location to a second location.

14. The method according to claim 13, further comprising unlocking a caster for each of the plurality of wheels prior to transporting the table.

15. A method comprising:
placing a first dolly on a first leg of an table and placing a second dolly on a second leg of the table, each dolly comprising:
a base portion including a first end and a second end;
a plurality of wheels attached to the base portion;
side walls extending from the base portion and defining a channel, wherein the plurality of wheels are connected to the base portion via a portion of the base portion that defines the channel; and
a securing mechanism coupled to the side walls, wherein an inside of the channel includes a block member disposed at the first end of the base portion;
attaching the first dolly and the second dolly to the table by operating the securing mechanism for each of the first dolly and the second dolly; and
rotating the table to a position, wherein rotating the table results in the first dolly and the second dolly sitting upright with a first particular plurality of wheels for the first dolly and a second particular plurality of wheels for the second dolly contacting a floor surface, and wherein the block member is configured to angle a corresponding leg of the table such that a top surface of the table is non-parallel with the ground and is non-perpendicular with the ground after rotating the table.

16. The method according to claim 15, further comprising adding insulation to the first dolly prior to attaching the first dolly to the table and adding second insulation to the second dolly prior to attaching the second dolly to the table.

17. The method according to claim 15, wherein rotating the table moves the base portion from being non-parallel with the ground to being parallel with the ground.

* * * * *

UNITED STATES PATENT AND TRADEMARK OFFICE
CERTIFICATE OF CORRECTION

PATENT NO. : 10,150,494 B2  
APPLICATION NO. : 15/087608  
DATED : December 11, 2018  
INVENTOR(S) : James W. Young Page 1 of 1

It is certified that error appears in the above-identified patent and that said Letters Patent is hereby corrected as shown below:

In the Claims

Column 9, Claim 15, Line 2, "of an table" should read --of a table--.

Signed and Sealed this  
Fifth Day of March, 2019

Andrei Iancu  
*Director of the United States Patent and Trademark Office*